United States Patent
Yang et al.

(10) Patent No.: US 6,617,917 B2
(45) Date of Patent: Sep. 9, 2003

(54) CALLER-ID DEMODULATION APPARATUS AND METHOD USING MULTIPLE THRESHOLDS

(75) Inventors: Chung-gil Yang, Gunpo (KR); Il-joong Kim, Yongin (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/086,787

(22) Filed: Mar. 1, 2002

(65) Prior Publication Data

US 2002/0150172 A1 Oct. 17, 2002

(30) Foreign Application Priority Data

Apr. 17, 2001  (KR) ........................................ 2001-20497

(51) Int. Cl.$^7$ ................................................ H03D 3/00
(52) U.S. Cl. ...................................... 329/300; 329/304
(58) Field of Search ............................... 329/300, 303, 329/304; 375/323, 324, 326, 329, 334

(56) References Cited

U.S. PATENT DOCUMENTS

| 4,115,738 A | * | 9/1978 | Mitarai et al. ............... 329/303 |
| 5,469,112 A | * | 11/1995 | Lee ............................. 329/302 |
| 5,754,606 A | * | 5/1998 | Matsuyama et al. ........ 375/373 |
| 6,272,184 B1 | * | 8/2001 | Ta et al. ..................... 375/334 |

* cited by examiner

Primary Examiner—My-Trang Nu Ton
(74) Attorney, Agent, or Firm—F. Chau & Associates, LLP

(57) ABSTRACT

A caller identification (ID) demodulating apparatus and method using multiple thresholds. An apparatus according to one embodiment comprises a zero crossing detector for generating pulses at points where the modulated caller ID information crosses zero and outputs each pulse as a zero crossing signal, a data extractor for computing a zero crossing interval between each output pulse of the zero crossing signal, and comparing the zero crossing interval with a plurality of thresholds to generate extracted data, and a clock generator for generating a data recovery clock signal for recovering the extracted data in response to the extracted data, wherein the data recovery clock signal is enabled at the middle point of the unit data length of the extracted data. The apparatus and method use multiple thresholds to extract data from caller ID modulated in a CPFSK format, thereby accurately extracting data at an interval where data "0" and "1" coexist. Furthermore, the clock signal for demodulating extracted data is generated about at the middle point of the unit data length of the extracted data, thereby demodulating data accurately.

20 Claims, 13 Drawing Sheets

CALLER-ID DEMODULATION APPARATUS AND METHOD USING MULTIPLE THRESHOLDS

CROSS-REFERENCE TO RELATED APPLICATION

This application claims priority to Korean Patent Application No. 2001-20497 filed on Apr. 17, 2001.

BACKGROUND

1. Technical Field

The present invention relates to a caller identification (ID) demodulator for demodulating caller ID information, and more particularly, to a caller ID demodulating apparatus and method for demodulating caller ID information using multiple thresholds.

2. Description of Related Art

Telephone companies currently provide various services such as a caller ID service to their subscribers by mounting micro-controllers and LCDs on wired or wireless telephones. For a caller ID service, a central office transmits caller ID information to a called subscriber's telephone terminal by modulating the caller ID in a continuous phase frequency shift keying (CPFSK) format (which is one type of FSK modulation). The CPFSK modulation indicates that the phase of an FSK modulated analog signal is continuous at both a stop point of previous data and a start point of next data, on a time axis, during data transfer.

A zero crossing detection technique is typically used in demodulating FSK modulated signals. The technique extracts zero crossing intervals from a FSK modulated signal and demodulates the FSK modulated signal to a zero (0) or one (1).

Further, white Gaussian noise is added to a binary FSK modulated signal during signal transmission so that zero crossing intervals of the FSK modulated signal are distributed at "0" and "1" regions as a Gaussian curve. FIG. 1 shows a distribution of the zero crossing intervals of a binary FSK modulated signal. Referring to FIG. 1, the zero crossing intervals of the binary FSK modulated signal are distributed in Gaussian curves, in which centers "a" and "b" of the Gaussian curves respectively correspond to zero (0) and one (1) and the curves are symmetric with each other.

A conventional caller ID demodulation method comprises setting an appropriate threshold, and determining whether the zero crossing interval of received data is greater or less than the threshold to determine whether the data is "1" or "0". However, since the phase of a CPFSK-modulated signal varies randomly in caller ID information service, the zero crossing interval of the modulated signal is distributed over a wide range unlike in FIG. 1. Thus, a conventional method that uses only one threshold for determining "0" or "1", such as shown in FIG. 1, has disadvantage of causing errors during data demodulation.

SUMMARY OF THE INVENTION

It is an object of the present invention to provide a caller identification (ID) demodulator using multiple thresholds suitable for continuous phase frequency shift keying (CPFSK) demodulation.

It is another object of the present invention to provide a caller ID demodulation method using multiple thresholds for data demodulation.

It is another object of the present invention to provide a clock signal generator for generating clock signal to demodulate data in a caller ID demodulator.

It is further object of the present invention to provide a clock signal generation method for generating clock signal to demodulate data in caller ID demodulator.

According to one aspect of the invention, it is provided a demodulator for demodulating caller identification (ID) information modulated in a continuous phase frequency shift keying (CPFSK) format. The demodulator comprises a zero crossing detector for generating pulses at points where the modulated caller ID information crosses zero and outputs each pulse as a zero crossing signal, a data extractor for computing a zero crossing interval between each output pulse of the zero crossing signal, and comparing the zero crossing interval with a plurality of thresholds to generate extracted data; and a clock generator for generating a data recovery clock signal for recovering the extracted data in response to the extracted data, wherein the data recovery clock signal is enabled at the middle point of the unit data length of the extracted data.

In one embodiment of the present invention, the extracted data comprises first extracted data having a logic value of high and second extracted data having a logic value of low.

According to another aspect of the invention, it is provided a method for demodulating caller identification (ID) information modulated in a continuous phase frequency shift keying (CPFSK) format. The method comprises the steps of receiving the CPFSK-modulated caller ID information and generating a zero crossing signal, wherein the zero crossing signal comprises pulses produced at points where the modulated caller ID information crosses zero, calculating a zero crossing interval between pulses of the zero crossing signal, comparing the zero crossing interval with a plurality of thresholds to generate extract data, and generating a data recovery clock signal for recovering the extracted data, wherein the data recovery clock signal is enabled at the middle point of the unit data length of the extracted data.

According to another aspect, it is provided an apparatus for generating a data recovery clock signal that is used for recovering data extracted from a demodulator. The apparatus comprises an edge detector for detecting a rising or falling edge of the extracted data and outputting the detected edge as an edge detection signal, a clock counter for counting the number of cycles of a system clock signal, wherein the clock counter is reset in response to the edge detection signal or when the number of the cycles is n+1 (where n>1), a clock generator for generating a data recovery clock signal for recovering the extracted data, wherein the data recovery clock signal is enabled when the number of the cycles is n/2 and is disabled in response to a reset signal, and a reset signal generator for generating the reset signal.

In one embodiment of the present invention, the time for counting the number of cycles of the system clock signal up to n corresponds to the time corresponding to a unit data length of the extracted data.

According to further aspect of the present invention, it is provided a method for generating a data recovery clock signal that is used for recovering data extracted from a demodulator. The method comprises the steps of initializing the number of cycles of a system clock signal, counting the number of cycles of the system clock signal until n/2 (where n>1) and generating a data recovery clock signal when the number of the cycles is n/2, determining whether a rising or falling edge of the extracted data is detected while the number of the cycles is greater than n/2 and less than n, and disabling the data recovery clock signal when the edge of the extracted data is detected or the number of the cycles is n.

BRIEF DESCRIPTION OF THE DRAWINGS

The above and other objects, aspects and advantages of the present invention will become apparent by describing in detail preferred embodiments thereof with reference to the attached drawings in which.

DETAILED DESCRIPTION OF PREFERRED EMBODIMENTS

Figure 1:
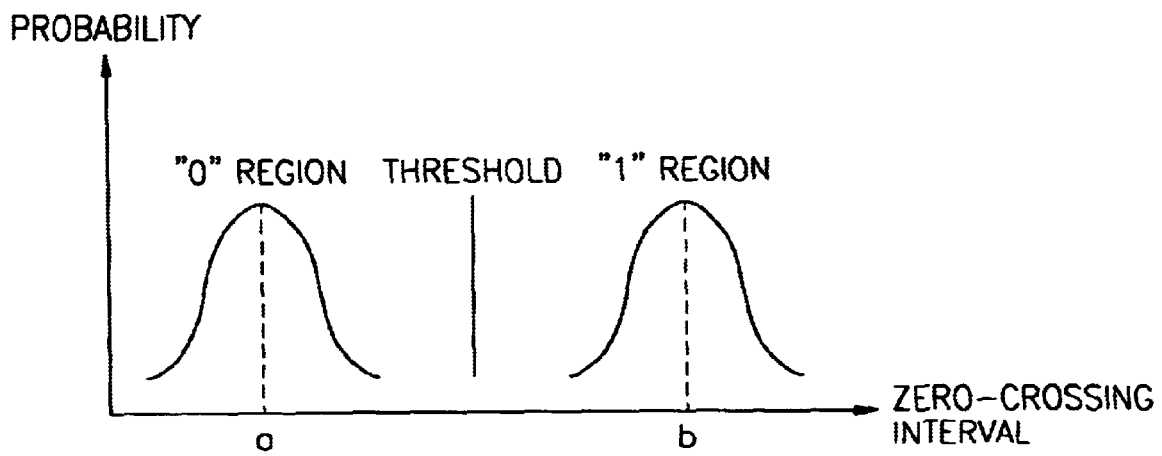
FIG. 1 is a graph showing a distribution of the zero crossing interval of a binary frequency shift keying (FSK) signal, which is implemented in a conventional caller Identification (ID) demodulation method.
Figure 2:
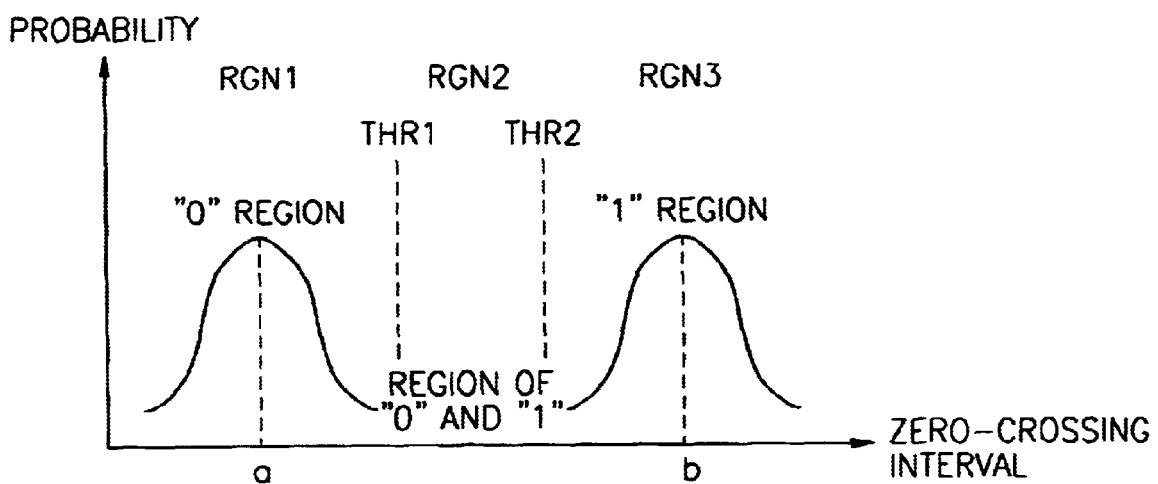
FIG. 2 is a graph showing a distribution of the zero crossing interval of a continuous phase FSK signal, which is implemented in a caller ID demodulation method according to an embodiment of the present invention.

As described above, a continuous phase frequency shift keying (CPFSK)-modulated signal is distributed in a Gaussian curve, in which the modulated signal is distributed over a wide range between the zero crossing interval "a" representing data "0" and the zero crossing interval "b" representing data "1". A conventional caller ID demodulation method, using only one threshold as shown in FIG. 1, may demodulate wrong data at the instant a data value changes from "0" to "1" or vice versa. Thus, a caller ID demodulation method according to an embodiment of the present invention comprises multiple thresholds for demodulating data as shown in FIG. 2. For instance, two thresholds, e.g., first and second thresholds (THR1 and THR2) are used to divide zero crossing intervals into three regions (RGN1–RGN3) for data demodulating. The first region (RGN1) comprises zero crossing intervals less than the first threshold (THR1), and the second region (RGN2) comprises zero crossing intervals between the first and second thresholds (THR1 and THR2). The third region (RGN3) comprises zero crossing intervals greater than the second threshold (THR2). Here, the first region (RGN1) comprises zero (0) data, the second region (RGN2) comprises zero (0) data and one (1) data, and the third region RGN3 comprises one (1) data.

That is, if a central office transmits the zero crossing interval of the CPFSK-modulated signal belonging to the first region (RGN1), the signal is demodulated as a logic value "0". If the zero crossing interval belongs to the third region (RGN3), the signal is demodulated as a logic value "1". If the zero crossing interval belongs to the second region (RGN2), the signal is demodulated as a logic value "1" or "0" based on a previously demodulated data value.

Figure 3:
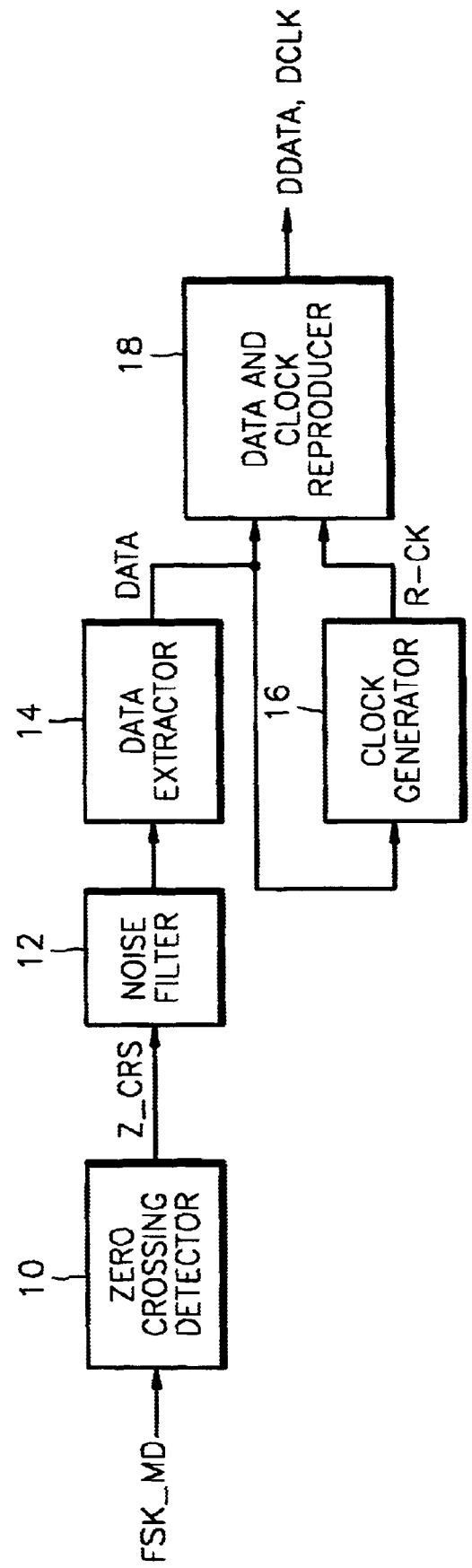
FIG. 3 is a schematic block diagram of a caller ID demodulator according to an embodiment of the present invention.

FIG. 3 is a schematic block diagram of a caller identification (ID) demodulator using multiple thresholds according to a preferred embodiment of the present invention. The caller ID demodulator comprises a zero crossing detector 10, a noise filter 12, a data extractor 14, a clock generator 16, and a data and clock reproducer 18. Referring to FIG. 3, the zero crossing detector 10 receives from an external central office a modulated signal (FSK_MD) having first and second frequency components, generates a pulse at a point the modulated signal (FSK_MD) crossing zero, and outputs the pulse as a zero crossing signal (Z_CRS). The modulated signal (FSK_MD) is generated by modulating caller ID information in a CPFSK format and transmitted from the external central office. For example, the external central office transmits the modulated signal (FSK_MD) at a transmission rate of 1.2 Kbps according to BELLCORE standards. Data "0" (transmitted from the central office) is referred to as a "space" and has the first frequency component, e.g., a frequency of 2.2 kHz. Data "1" is referred to as a "mark" and has the second frequency component, e.g., a frequency of 1.2 kHz.

The noise filter 12 removes noise from the zero crossing signal (Z_CRS) extracted from the zero crossing detector 10. For instance, if the zero crossing interval between two consecutive pulses in the zero crossing signal (Z_CRS) is no greater than a predetermined value, the noise filter 12 determines that the latter one of the two pulses is a pulse due to noise and removes the noise pulse, thereby removing noise included in the modulated signal (FSK_MD). The modulated signal (FSK_MD) is likely to have noise such as white Gaussian noise. For instance, if the zero crossing interval in the zero crossing signal (Z_CRS) is no greater than a predetermined value, e.g., 165 $\mu s$, the noise filter 12 determines that the latter pulse of two pulses is a noise pulse and removes that pulse. In this way, noise having high frequency can be removed effectively. For instance, the zero crossing interval of the modulated signal (FSK_MD) corresponding to "1" is about 416 $\mu s$, whereas the zero crossing interval of the modulated signal (FSK_MD) corresponding to data "0" is about 224 $\mu s$.

The data extractor 14 receives the zero crossing signal (Z_CRS) filtered by the noise filter 12 and calculates the zero crossing interval between the zero crossing pulses of the zero crossing signal (Z_CRS). Then, the data extractor 14 compares the calculated zero crossing interval with the first and second thresholds (THR1 and THR2), and extracts data "0" or "1" depending on the comparison result. For example, assume that the first and second thresholds (THR1 and THR2) are set to about 300 $\mu s$ and 350 $\mu s$, respectively. The data extractor 14 extracts data "0" if the zero crossing interval is no greater than 300 $\mu s$, while it extracts data "1"

if the zero crossing interval is no less than 350 $\mu$s. Also, if the zero crossing interval exists between 300 $\mu$s and 350 $\mu$s, the data extractor 14 extracts data "0" or "1" depending on a previously extracted data value.

When the modulated signal (FSK_MD) is transmitted from the external central office at transmission speed of 1.2 Kbps, a time interval for representing one data (hereinafter called "unit data length") is 833 $\mu$s. Thus, data "0", having a frequency of 2.2 kHz, has three or more zero crossing points within the unit data length and data "1", having a frequency of 1.2 kHz, has one or more zero crossing points within the unit data length. For instance, the data extractor 14 extracts data "0" if two or more zero crossing signals (Z_CRS), having the zero crossing interval less than the first threshold (THR1), exist within the unit data length. On the other hand, the data extractor 14 extracts data "1" if at least one zero crossing signal (Z_CRS), having a zero crossing interval greater than the second threshold (THR2), exists in the unit data length.

The zero crossing interval corresponding to data "1" is generally between 350 $\mu$s and 625.7 $\mu$s. If the zero crossing interval of a modulated signal is no less than 625.7 $\mu$s, the signal can be determined as undesired data, and the zero crossing interval can be considered as an interval where data "0" exists. Thus, if a zero crossing signal (Z_CRS), having a zero crossing interval no less than 625.7 $\mu$s, is input, the data extractor 14 extracts and outputs data "0". Thus, the data extractor 14 sets the first, second, and third thresholds (THR1, THR2, and THR3) to about 300 $\mu$s, 350 $\mu$s, and 625.7 $\mu$s, respectively.

The clock generator 16 receives the data (DATA) extracted from the data extractor 14 and generates a data recovery clock signal (R_CK) for recovering the extracted data. As described above, when the transmission speed is 1.2 Kbps, the unit data length is 1/1.2 Kbps (i.e., about 833 $\mu$s). The clock generator 16 generates a clock signal enabled at the middle point of the unit data length (i.e., 416 $\mu$s), thereby recovering data accurately. The data and clock reproducer 18 receives extracted data (DATA) from the data extractor 14 and the data recovery clock signal (R_CK) from the clock generator 16. Then, the data and clock reproducer 18 converts the extracted data (DATA) and the clock signal (R_CK) into a form suitable for caller ID service protocols and outputs the result as reproduced data (DDATA) and a reproduced clock signal (DCLK), respectively. For example, the data and clock reproducer 18 extracts only caller ID data from the extracted data (DATA) and outputs the caller ID data as the reproduced data (DDATA). Also, for example, the data and clock reproducer 18 outputs a clock signal for recovering the 8-bit reproduced data (DDATA) as the reproduced clock signal (DCLK).

Figure 4:
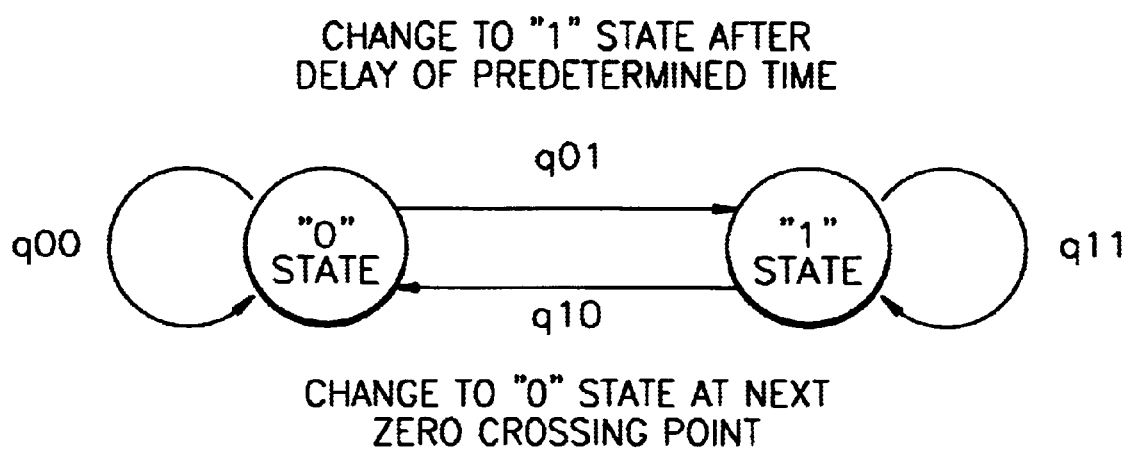
FIG. 4 is a state diagram showing changes in the state of data extracted by the caller ID demodulator of FIG. 3.

FIG. 4 shows changes in the state of extracted data (DATA) based on a zero crossing interval of the modulated signal (FSK_MD). Referring to FIGS. 2–4, a first state (q00) indicates that the zero crossing interval of a zero crossing signal (Z_CRS) is no greater than a first threshold (THR1). In the first state (q00), a data extractor 14 extracts and outputs data "0" if the zero crossing signal (Z_CRS), having the zero crossing interval less than the first threshold (THR1), are input twice successively. A second state (q01) indicates that the zero crossing interval of the zero crossing signal (Z_CRS) is between the first and second thresholds (THR1 and THR2). The second state (q01) is the state that the first state (q00) changes to a third state (q11). In the second state (q01), the data extractor 14 extracts and outputs data "1" after a predetermined time has lapsed from the input of the zero crossing signal (Z_CRS). A third state (q11) indicates that the zero crossing interval of the zero crossing signal (Z_CRS) is no less than the second threshold (THR2). In the third state (q11), the data extractor 14 extracts and outputs data "1". A fourth state (q10) indicates that the zero crossing interval of the zero crossing signal (Z_CRS) is between the second and first thresholds (THR2 and THR1). The fourth state (q10) is the state that the third state (q11) changes to the first state (q00). In the fourth state (q10), the data extractor 14 extracts and outputs "0" when a next zero crossing signal is input.

Figure 5:
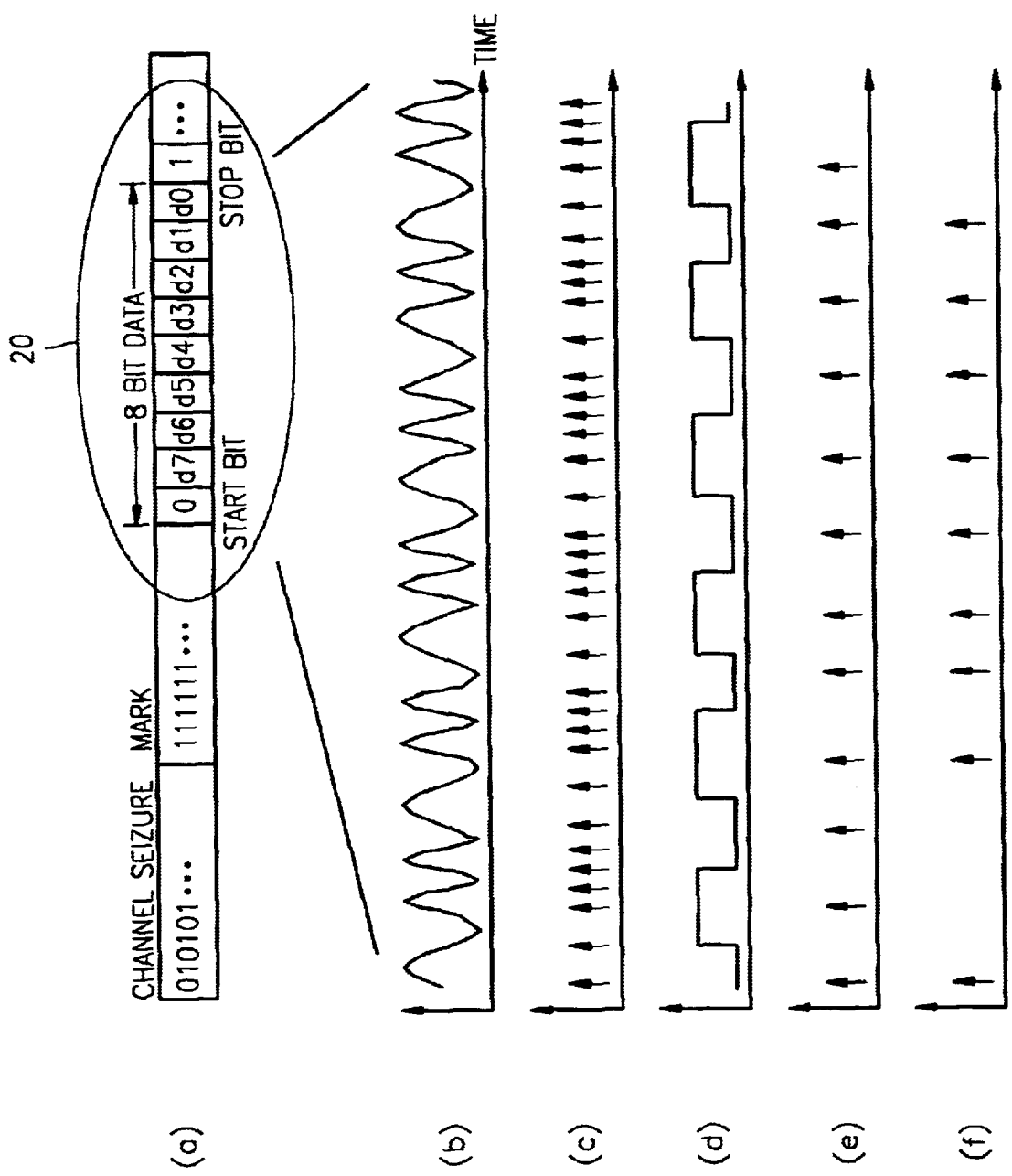
FIGS. 5(a)–5(f) show operational waveforms of components of the caller ID demodulator of FIG. 3.

FIGS. 5(a)–5(f) show operational waveforms of components of the demodulator of FIG. 3. FIG. 5(a) shows the format of a caller ID to be transmitted from an external central office to the demodulator of FIG. 3. That is, as shown in FIG. 5, the external central office transmits actual caller ID data 20 to the demodulator after transmitting channel seizure and mark data. The caller ID data 20 comprises 8 bits, in which 1 bit of a start bit signifying the beginning of the caller ID data and 1 bit of a stop bit signifying the end thereof are allocated at the head and tail of the 8-bit data, respectively.

FIG. 5(b) shows the operational waveform of the CPFSK-modulated signal (FSK_MD) transmitted from the external central office to a zero crossing detector 10 of the demodulator through a transmission channel. For instance, the external central office modulates the caller ID data (as shown in FIG. 5) into a CPFSK format, and transmits the CPFSK-modulated signal to the zero crossing detector 10 at a transmission speed of 1.2 Kbps. Preferably, data "0" and "1" are modulated as a 2.2 kHz signal and a 1.2 kHz signal, respectively.

FIG. 5(c) shows the operational waveform of the zero crossing signal (Z_CRS) generated by the zero crossing detector 10. That is, the zero crossing detector 10 generates a pulse at a point where the modulated signal (FSK_MD) crosses zero and outputs that pulse as the zero crossing signal (Z_CRS).

FIG. 5(d) shows the operational waveform of the data extracted from a data extractor 14. That is, the data extractor 14 receives the zero crossing pulses as shown in FIG. 5(c) to calculate an interval between the zero crossing pulses, and extracts and outputs data "0" or "1" based on the interval between the pulses.

FIG. 5(e) shows the operational waveform of the data recovery clock signal (R_CK) output from a clock generator 16. That is, the clock generator 16 generates the data recovery clock signal (R_CK) for recovering the extracted data output from the data extractor 14. FIG. 5(f) shows the operational waveform of a reproduced clock signal (DCLK) for recovering reproduced data (DDATA) corresponding to the caller ID data 20 in a data and clock reproducer 18.

Figure 6:
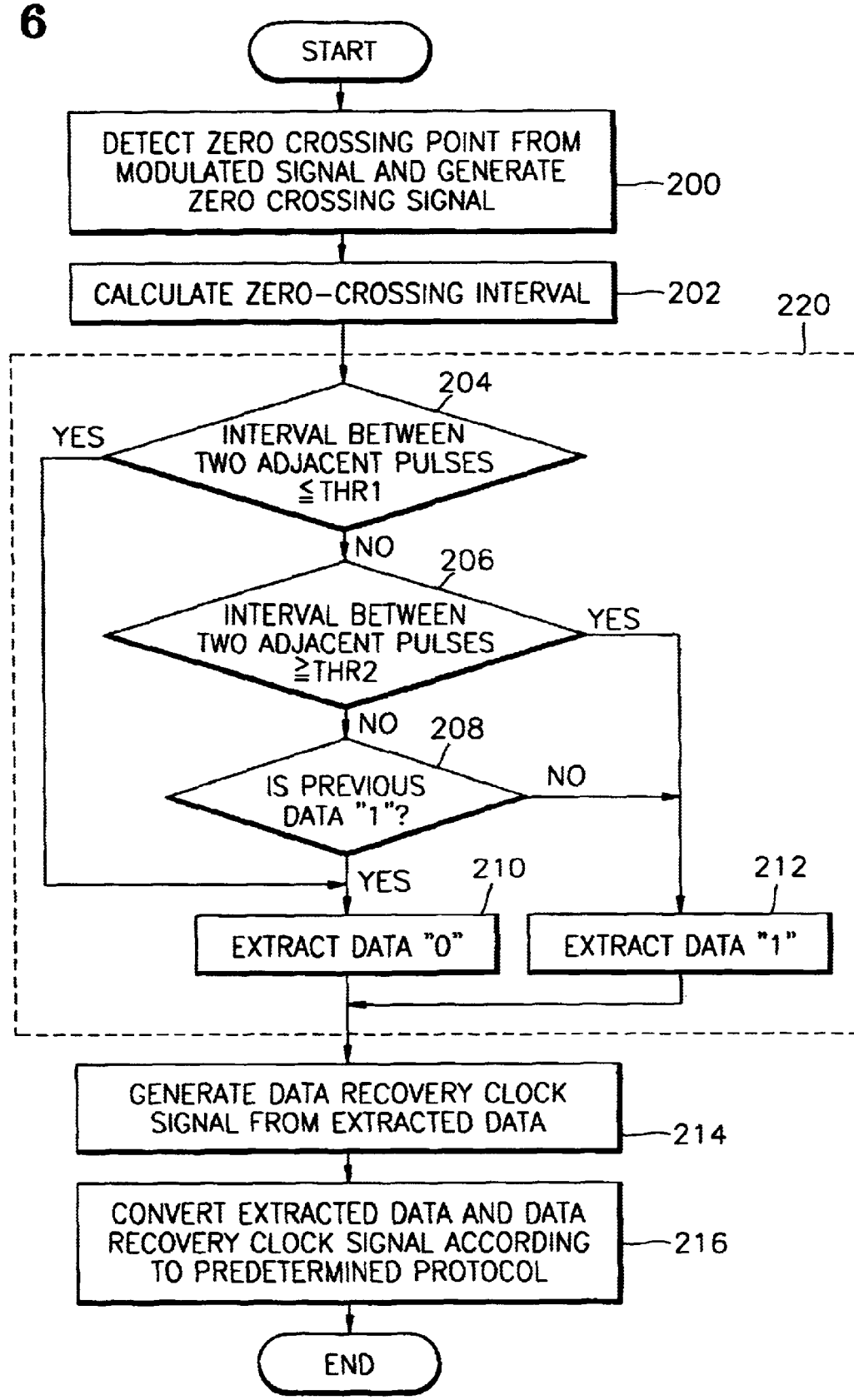
FIG. 6 is a flowchart showing a caller ID demodulation method according to an embodiment of the present invention.

FIG. 6 is a flowchart showing a caller ID demodulation method according to an embodiment of the present invention. Referring to FIGS. 3 and 6, first, a zero crossing detector 10 receives a modulated signal (FSK_MD) from an outside, generates a pulse at a point where the modulated signal (FSK_MD) crosses zero, and outputs the pulse as a zero crossing signal (Z_CRS) (step 200).

After step 200, the zero crossing signal (Z_CRS) passes through a noise filter 12 to remove a zero crossing signal due to noise. That is, if the zero crossing interval between two consecutive pulses in the zero crossing signal (Z_CRS) is no greater than a predetermined value, the latter one of the two pulses is determined as a pulse noise and then removed, thereby effectively removing high frequency component noise.

At step 202, a data extractor 14 calculates a zero crossing interval, compares the zero crossing interval with predetermined first and second thresholds (THR1 and THR2), and extracts data "0" or "1" according to the comparison result. For example, the first and second thresholds (THR1 and THR2) are set to about 300 μs and 350 μs, respectively. More specifically, the data extractor 14 calculates the interval between two consecutive zero crossing pulses from the zero crossing signal (Z_CRS) as the zero crossing interval, and compares the zero crossing interval with the first threshold (THR1) (step 204). The data extractor 14 calculates a next zero crossing interval if the zero crossing interval is less than the first threshold (THR1). Then, if the next zero crossing interval is less than the first threshold (THR1), the data extractor 14 determines that data "0" has been input and output data "0" (step 210). On the other hand, if the zero crossing interval is greater than the first threshold (THR1), it is determined whether the zero crossing interval is greater than the second threshold (THR2) (step 206). If the zero crossing interval is no less than the second threshold (THR2), the data extractor 14 determines that data "1" has been input and outputs data "1" (step 212).

If the zero crossing interval is less than the second threshold (THR2), that is, if the zero crossing interval is between the first and second thresholds (THR1 and THR2), input data is extracted based on the previously extracted data value (step 208). That is, if the previously extracted data is data "1", a next zero crossing interval is calculated, and if the next zero crossing interval is less than the first threshold (THR1), data "0" is extracted (step 210). On the other hand, if the previously extracted data is data "0", the data extractor 14 determines that data "1" has been input and outputs data "1" (step 212).

At a step 214, a clock generator 16 receives the data extracted from the data extractor 14 and generates a data recovery clock signal (R_CK) enabled at the middle point of a unit data length. As described above, if transmission speed is 1.2 kbps, the unit data length is 1/1.2 Kbps (i.e., about 833 μs). Thus, the clock generator 16 generates a signal, enabled at about 416 μs after data input, as the data recovery clock signal (R_CK).

At a step 216, a data and clock reproducer 18 converts the data (DATA) and the data recovery clock signal (R_CK) generated from the data extractor 14 and the clock generator 16 according to a predetermined protocol, and outputs the result (step 216). For example, the data and clock reproducer 18 outputs the data, corresponding to the actual caller ID data 20 (as shown in FIG. 5(*a*)) among the extracted data (DATA), as reproduced data (DDATA). Also, the data and clock reproducer 18 outputs a reproduced clock signal (DCLK) for recovering the reproduced data (DDATA).

Advantageously, a caller ID demodulating apparatus and a method thereof according to the present invention comprise two or three thresholds to extract data from a caller ID modulated in a CPFSK format, thereby exactly extracting data even when data "1" and "0" are mixed together. Furthermore, the clock signal for demodulating the extracted data is generated at a middle point of the extracted data, thereby demodulating data accurately.

Figure 7:
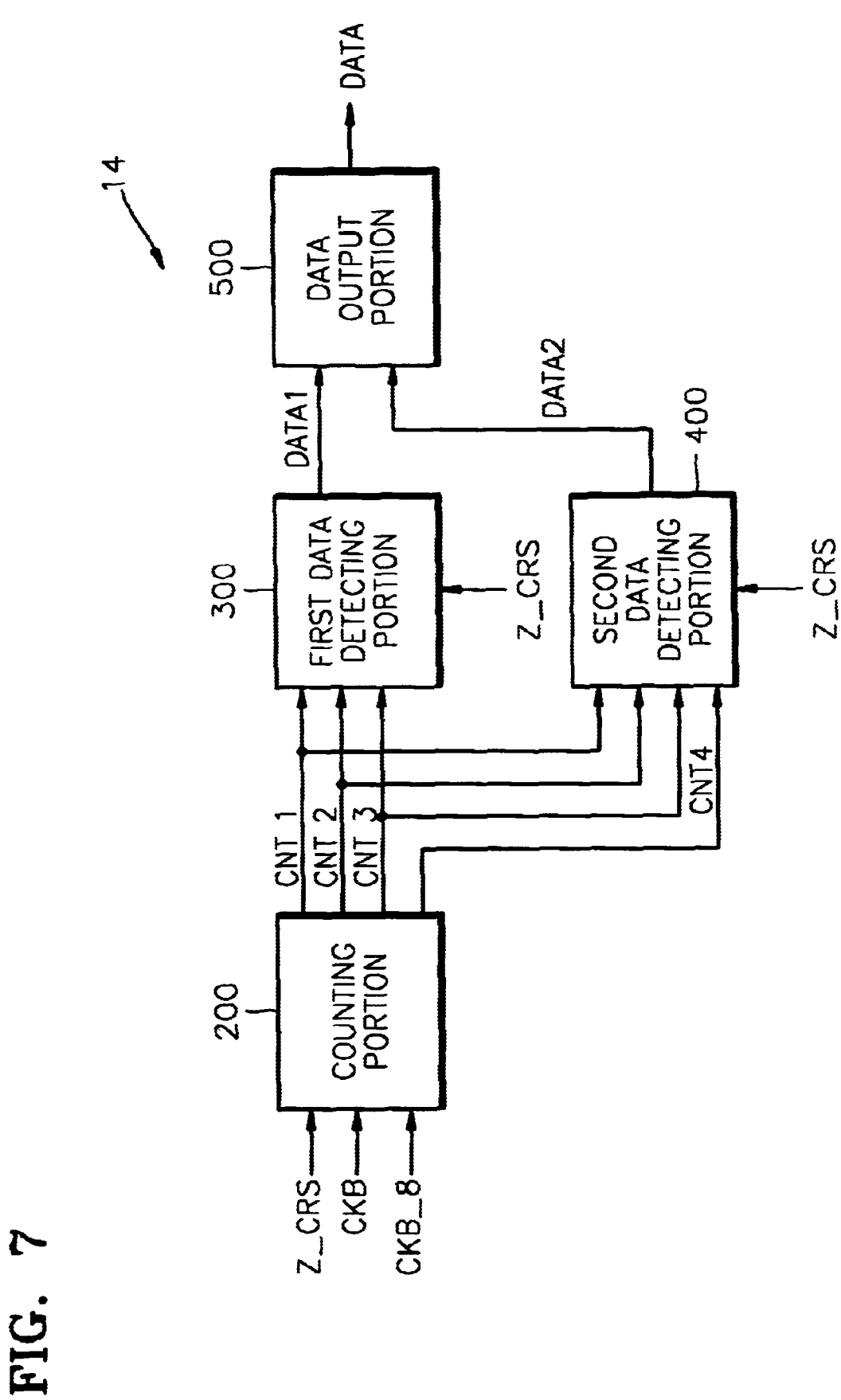
FIG. 7 is a schematic block diagram of a data extractor of a caller ID demodulator according to an embodiment of the present invention.

FIG. 7 is a block diagram of a data extractor 14 according to an embodiment of the present invention. Referring to FIG. 7, a data extractor 14 comprises a counting portion 200, first and second data detecting portions 300 and 400, and a data output portion 500. The counting portion 200 counts the number of cycles of a frequency-divided system clock signal (CKB_8) to calculate a zero crossing interval and generates first through third counting signals (CNT1, CNT2, and CNT3) based on the zero crossing interval, in response to a zero crossing signal (Z_CRS). The frequency-divided system clock signal (CKB_8) comprises frequency divided at a predetermined frequency division rate, for example, the frequency is generated by dividing the frequency 3.58 MHz of a system clock signal (CKB) of by 8.

The first counting signal (CNT1) is enabled during a first interval (RGN1), the second counting signal (CNT2) is enabled during a second interval (RGN2), and the third counting signal (CNT3) is enabled during a third interval (RGN3). Here, the first interval (RGN 1), in which data "0" exists, has the zero crossing interval ranging from 0 to about 300 μs. Also, the first interval (RGN1) corresponds to the time (=298.2 μs) for counting the number of cycles of the frequency-divided system clock signal (CKB_8) from 0 to 133. The second interval (RGN2), in which data "0" and "1" coexist, has the zero crossing interval ranging from about 300 to 350 μs and corresponds to the time (=298.2 to 349.3 μs) for counting the number of cycles of the frequency-divided system clock signal (CKB_8) from 133 to 52. The third interval (RGN 3), in which "1" exists, has the zero crossing interval greater than 350 μs, and corresponds to the time for counting the number of cycles of the frequency-divided system clock signal (CKB_8) up from 152. In general, the zero crossing interval corresponding to data "1" has a range of 350 to 625.7 μs. If the zero crossing interval is no less than 625.7 μs, it can be determined that undesired data is input. The interval having the undesired data can be considered as the interval where "0" exists. Thus, the counting portion 200 generates a fourth counting signal (CNT4) when the counted value of the counting portion 200 reaches "280" corresponding to the zero crossing interval of 625.7 μs.

The first data detecting portion 300 receives the first through third counting signals (CNT1–CNT3) and the zero crossing signal (Z_CRS), and generates a pulse signal (that indicates the detection of first data) as a first data detection signal (DATA1). For example, the first data detecting portion 300 generates the first data detection signal (DATA1) when the third counting signal (CNT3) is input in response to the zero crossing signal (Z_CRS). Also, the first data detecting portion 300 generates the first data detection signal (DATA1) when a predetermined period of time (for example, 205 μs) has lapsed after the first and second counting signals (CNT1 and CNT2) were input in response to the zero crossing signal (Z_CRS), sequentially.

The second data detecting portion 400 receives the first through fourth counting signals (CNT1–CNT4) and the zero crossing signal (Z_CRS), and generates a pulse signal (that indicates the detection of second data) as a second data detection signal (DATA2). For example, the second data detecting portion 400 generates the second data detection signal (DATA2), when the first counting signal (CNT1) is input in response to the zero crossing signal (Z_CRS) after the first or second counting signal (CNT1 or CNT2) has been input in response to the zero crossing signal (Z_CRS). Also, the second data detecting portion 400 generates the second data detection signal (DATA2) when the fourth counting signal (CNT4) is input in response to the zero crossing signal (Z_CRS).

The data output portion 500 receives the first and second data detection signals (DATA1 and DATA2) in response to the system clock signal (CKB), and outputs a logic value as extracted data (DATA) depending on the data detection signal. For example, the data output portion 500 outputs a logic value "high" when the first data detection signal (DATA1) is enabled, and outputs a logic value "low" when the second data detection signal (DATA2) is enabled, as extracted data (DATA).

Figure 8:
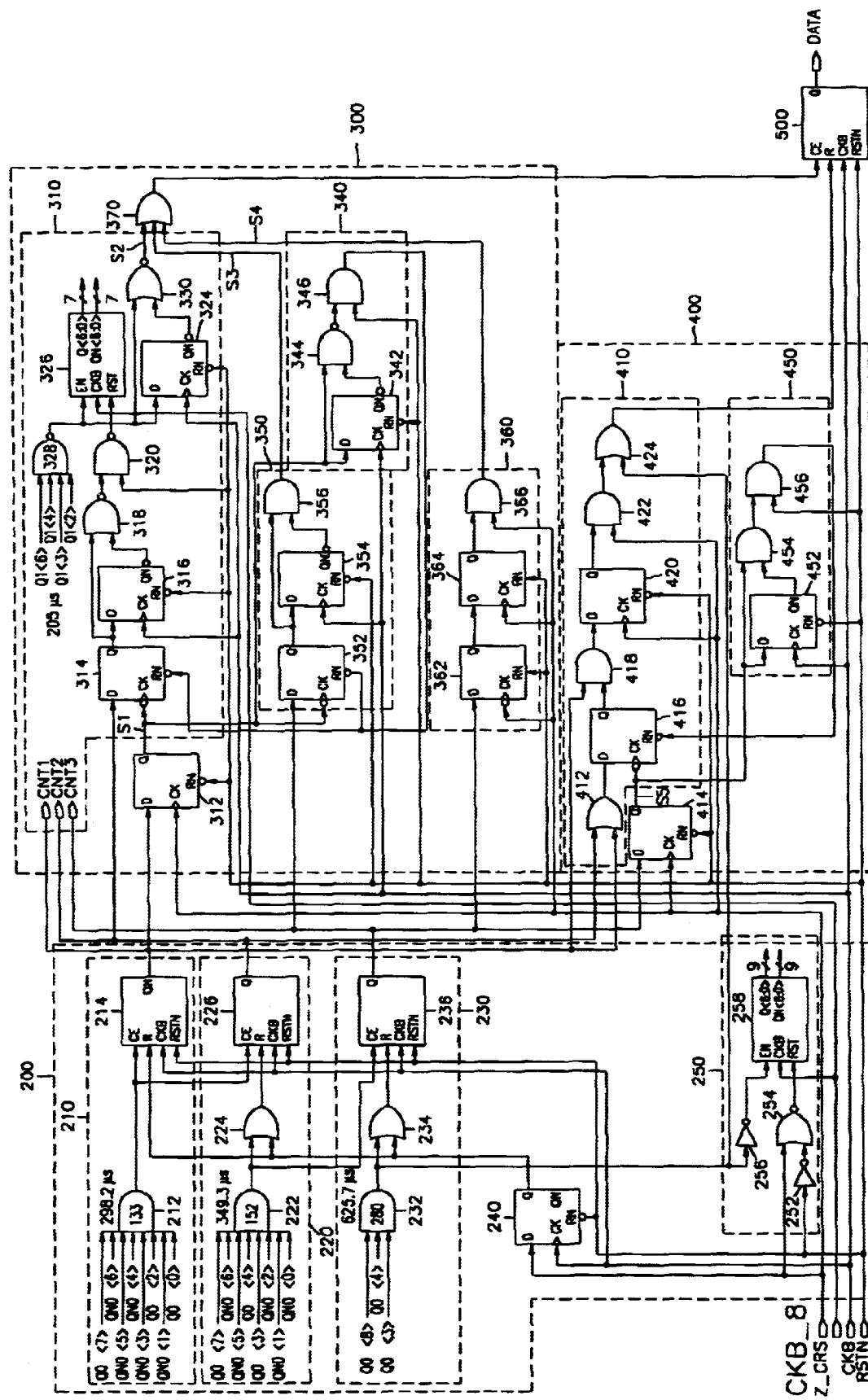
FIG. 8 is a detailed circuit diagram of the data extractor of FIG. 7 according to an embodiment of the present invention.

FIG. 8 is an exemplary circuit diagram of the data extractor of FIG. 7. Referring to FIG. 8, a counting portion 200 comprises a system clock counting portion 250, first through third counting signal generators 210, 220, and 230, and a flip-flop 240. A first data detecting portion 300 comprises a flip-flop 312, first through third detecting portions 310, 350, and 360, and a first reset signal generating portion 340, and an OR gate 370. Also, a second data detecting portion 400 comprises a flip-flop 414, a fourth detecting portion 410, and a second reset signal generating portion 450.

FIGS. 9(a)–(k) are operational waveforms of the circuit of FIG. 8 when data "1" is extracted. FIG. 9(a) shows a zero crossing signal (Z_CRS), and FIGS. 9(b)–9(d) respectively show first through third counting signals (CNT1–CNT3). FIG. 9(e) shows the output of the flip-flop 312, FIG. 9(f) shows a first reset signal (RS1) output from the first reset signal generating portion 340, FIG. 9(g) shows the output of a NAND gate 320 of the first detecting portion 310. FIGS. 9(h)–9(j) show output signals of the first through third detecting portions 310, 350, and 360, respectively, and FIG. 9(k) shows the output signal of the OR gate 370.

FIGS. 10(a)–10(j) are operational waveforms of the circuit of FIG. 8 when data "0" is extracted. FIG. 10(a) shows a zero crossing signal (Z_CRS), and FIGS. 10(b)–10(d) respectively show first through third counting signals (CNT1–CNT3. FIG). 10(e) shows the output of the flip-flop 414, and FIG. 10(f) shows a second reset signal (RS2) generated by the second reset signal generating portion 450. FIGS. 10(g)–10(j) show the outputs of an OR gate 412, flip-flops 416 and 420, and an AND gate 422 of the fourth detecting portion 410.

Figure 9:
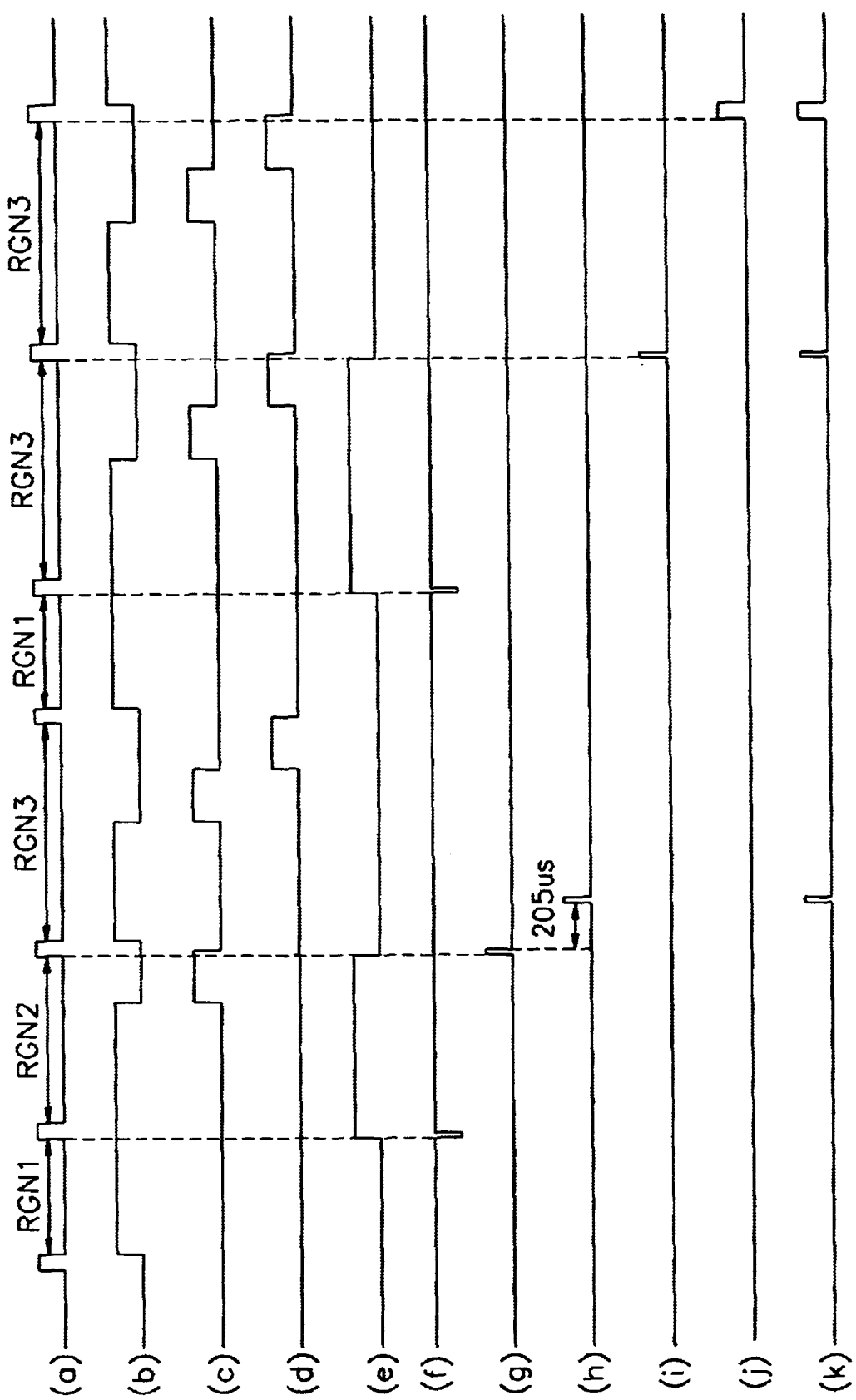
FIGS. 9(a)–9(k) are operational waveforms of the data extractor of FIG. 8 when data "1" is extracted.
Figure 10:
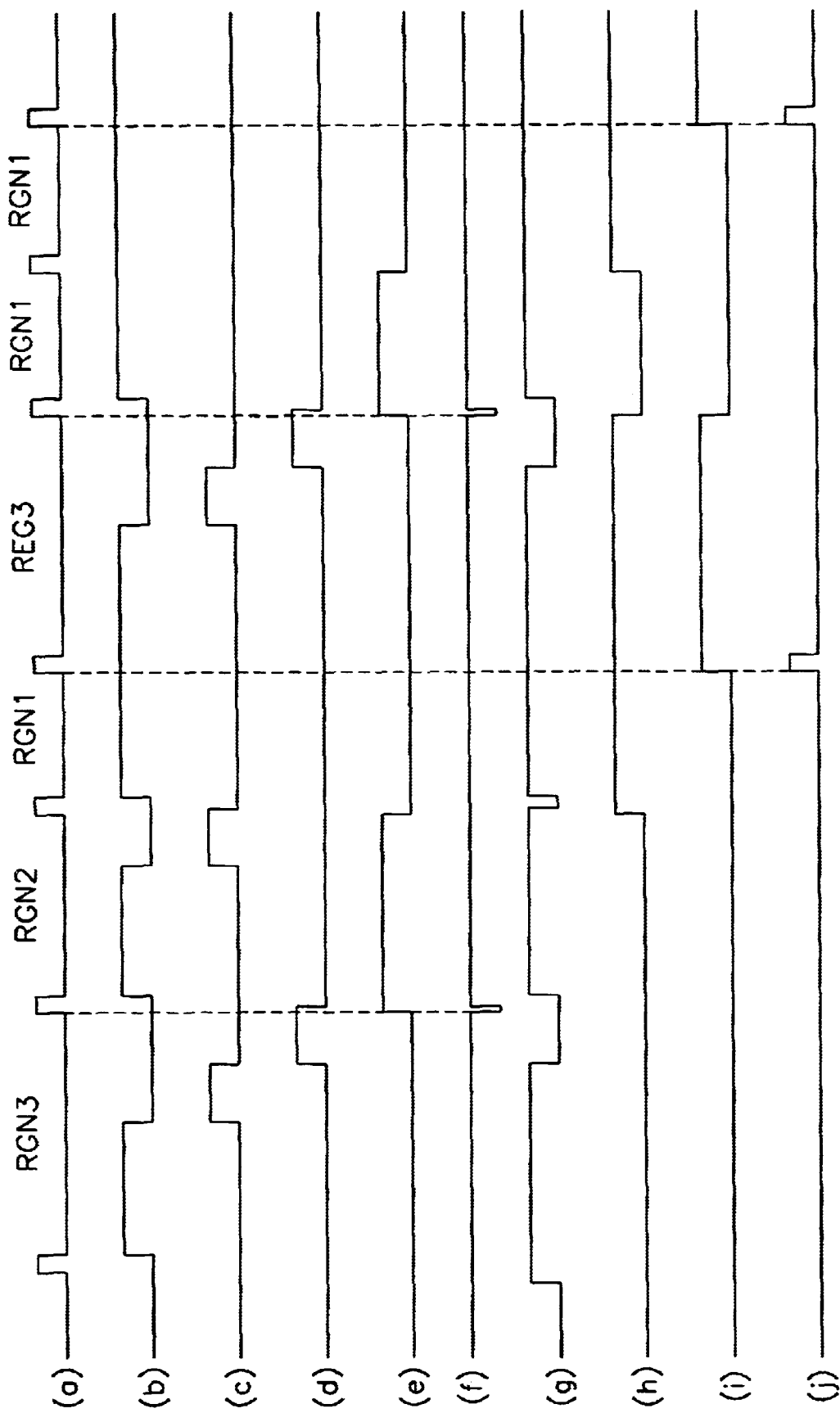
FIGS. 10(a)–10(j) are operational waveforms of the data extractor of FIG. 8 when data "0" is extracted.

Referring to FIGS. 8–10, the system clock counting portion 250 of a counting portion 200 counts the number of cycles of a frequency-divided system clock signal (CKB_8) in response to a zero crossing signal (Z_CRS) and a system reset signal (RSTN). The system clock counting portion 250 is set when the counted value of the system clock counting portion 250 reaches 280 corresponding to the zero crossing interval of 625.7 $\mu$s.

Preferably, the system clock counting portion 250 comprises inverters 252 and 256, a NOR gate 254, and a counter 258. The inverter 252 inverts the system reset signal (RSTN), and the NOR gate 254 performs a NOR operation on the zero crossing signal (Z_CRS) and the inverted system reset signal to generate a signal for controlling the reset of the counter 258. The inverter 256 inverts a fourth counting signal (CNT4) that is enabled when the counted value of the counter 258 reaches 280. The counter 258 (for example, it is a 9-bit counter) counts the number of the frequency-divided clock signals (CKB_8) to output the counted result. Also, the counter 258 is reset in response to output signal of the NOR gate 254, while it is set in response to the fourth counting signal (CNT4) inverted by the inverter 256.

A flip-flop 240 of the counting portion 200 delays the zero crossing signal (Z_CRS) in response to a system clock signal (CKB) to generate a delayed zero crossing signal (DZ_CRS). A first counting signal generator 210 generates a first counting signal (CNT1) when the system clock counting portion 250 counts 0–133 corresponding to a first interval (RGN1).

Preferably, the first counting signal generator 210 comprises an AND gate 212 and a flip-flop 214. The AND gate 212 performs an AND operation on the output of the counter 258, and outputs a signal which is enabled while the counted value of the counter 258 reaches 133 corresponding to 298.2 $\mu$s. The flip-flop 214 receives the output signal of the AND gate 212 via a chip enable terminal CE in response to the system clock signal (CKB), and receives the delayed zero crossing signal (DZ_CRS) generated by the flip-flop 240 via a reset terminal R. Also, the flip-flop 214 generates an output signal via a positive output terminal Q. The output signal is set when the signal input to the chip enable terminal CE is enabled and reset when the signal input to the reset terminal R is enabled. That is, the output signal of the flip-flop 214 is reset while the counter 258 counts between 0 and 133 corresponding to the first interval (RGN1) and set by the output of the AND gate 212 when the counted value of the counter 258 reaches 133. On the other hand, the flip-flop 214 outputs via a negative output terminal QN an inverted version of the signal output from the positive output terminal Q, that is, the first counting signal (CNT1). The first counting signal (CNT1) is set when the counter 258 counts between 0 and 133 and reset when the counted value of the counter 258 reaches 133. The first counting signal (CNT1) is shown in FIGS. 9(b) and 10(b).

A second counting signal generator 220 of the counting portion 200 generates a second counting signal (CNT2) enabled when the system clock counting portion 250 counts between 133 and 152 corresponding to a second interval (RGN2).

Preferably, the second counting signal generator 220 comprises an AND gate 222, an OR gate 224, and a flip-flop 226. The AND gate 222 performs an AND operation on output of the counter 258, and outputs a signal which is enabled while the counted value of the counter 258 reaches 152 corresponding to 349.3 $\mu$s. The OR gate 224 performs an OR operation on the delayed zero crossing signal (DZ_CRS) generated by the flip-flop 240 and the output of the AND gate 222. The flip-flop 226 is set by the output signal of the AND gate 212 (that is input to a chip enable terminal CE) in response to the system clock signal (CKB) and reset by the output of the OR gate 224 (that is input to a reset terminal R). As a result, the flip-flop 226 outputs the second counting signal (CNT2) set while the counted value of the counter 258 is between 133 and 152 (that is during the second interval (RGN2)) via a positive output terminal Q.

A third counting signal generator 230 of the counting portion 200 generates a third counting signal (CNT3) enabled when the system clock counting portion 250 counts between 152 and 280 and a fourth counting signal (CNT4) enabled when the system clock counting portion 250 counts 280 or greater.

Preferably, the third counting signal generator 230 comprises an AND gate 232, an OR gate 234, and a flip-flop 236. The AND gate 232 performs an AND operation on output of the counter 258, and outputs the fourth counting signal (CNT4) which is enabled while the counted value of the counter 258 reaches 280 corresponding to 625.7 $\mu$s. Thus, when the output of the AND gate 232 is enabled, the counter 258 stops counting and maintains the count value of 280 until a reset signal is input to a reset terminal RST of the counter 258. That is, the AND gate 232 generates the fourth counting signal (CNT4) during a fourth interval (RGN4). The forth interval (RGN4) is that from counting 280 to inputting a next zero crossing signal (Z_CRS) or a system reset signal (RSTN). The OR gate 234 performs an OR operation on the delayed zero crossing signal (DZ_CRS) generated by the flip-flop 240 and the output of the AND gate 232. The flip-flop 236 is set by the output signal of the AND gate 222 (that is input to a chip enable terminal CE) in response to the system clock signal (CKB) and reset by the output signal of the OR gate 224 (that is input to a reset terminal R). As a consequence, the flip-flop 236 outputs the third counting signal (CNT3), which is set while the counter 258 counts between 152 and 280 (that is, during the third interval (RGN3)), to a positive output terminal Q.

The flip-flop 312 of a first data detecting portion 300 according to the present invention outputs the first counting signal (CNT1) (that is input in response to the zero crossing signal (Z_CRS)) as a first signal (S1) (as shown in FIG. 9(e)). The first reset signal generating portion 340 of the first data detecting portion 300 generates a first reset signal (RS1) for resetting first and second detecting portions 310 and 350.

Preferably, the first reset signal generating portion 340 comprises a flip-flop 342, a NAND gate 344, and an AND gate 346. The flip-flop 342 delays the first signal (S1) by one cycle of the system clock signal (CKB) in response to the system clock signal (CKB), and inverts the delayed first signal and outputs it via a negative output terminal QN. The NAND gate 344 performs a NAND operation on the first signal (S1) and the signal output via the negative output terminal QN of the flip-flop 342. The AND gate 346 performs an AND operation on the output signal of the NAND gate 344 and the system reset signal (RSTN) and outputs the result as the first reset signal (RS1), as shown in FIG. 9(f).

The first detecting portion 310 of the first data detection portion 300 receives the second counting signal (CNT2) in response to the first signal (S1), and detects the zero crossing signal (Z_CRS) of the second interval (RGN2). Then, after a predetermined time (T1) (for example, 205 µs) has lapsed, the first detecting portion 310 generates a first detection signal (S2) indicating the detection of data "1".

Preferably, the first detecting portion 310 comprises flip-flops 314, 316, and 324; NAND gates 318, 320, and 328; a NOR gate 330; and a counter 326. The flip-flop 314 outputs the second counting signal (CNT2) that is input in response to the falling edge of the first signal (S1). The flip-flop 316 inverts the output signal of the flip-flop 314 that is input in response to the system clock signal (CKB), and outputs the result to a negative output terminal QN. The NAND gate 318 performs a NAND operation on the signal output from the negative output terminal QN of the flip-flop 316 and the signal output from the flip-flop 314. The NAND gate 320 performs a NAND operation on the system reset signal (RSTN) and the output signal of the NAND gate 318 and outputs the result as a counter reset signal (CR2) for resetting the counter 326. As a result, the output signal of the NAND gate 320 is enabled at the instant the zero crossing signal (Z_CRS) of the second interval (RGN2) is generated, as shown in FIG. 9(g). The counter 326 for counting the number of cycles of the frequency-divided system clock signal (CKB_8) is reset in response to the counter reset signal (CR2) and enabled by an output signal of the NAND gate 328.

The NAND gate 328 performs a NAND operation on the output of the counter 326, and outputs a signal, that is enabled while the counted value of the counter 326 reaches 92 corresponding to 205 µs, to an enable terminal EN of the counter 326 and an input terminal D of the flip-flop 324. When the output of the NAND gate 328 is enabled, the counter 326 stops counting and maintains a count value of 92 until the counter reset signal (CR2) is input to the reset terminal RST of the counter 326. That is, the NAND gate 328 generates a signal enabled from counting the counted value of 92 to inputting the counter reset signal (CR2). The flip-flop 324 delays the output signal of the NAND gate 328 by one cycle of the system clock signal (CKB) in response to the system clock signal (CKB). The NOR gate 330 performs a NOR operation on the outputs of the NAND gate 328 and the flip-flop 324, and outputs the result as the first detection signal (S2). As shown in FIG. 9(h), the first detection signal (S2) is enabled at the instant of 205 µs after the zero crossing signal (Z_CRS) of the second interval (RGN2) is input. The second detecting portion 340 of the first data detection portion 300 receives the third counting signal (CNT3) in response to the first signal (S1), and detects the zero crossing signal (Z_CRS) of the third interval (RGN3) subsequent to the zero crossing signal (Z_CRS) of the first interval (RGN1). The zero crossing interval is generated subsequently to the zero crossing signal (Z_CRS) of the first interval (RGN1).

Preferably, the second detecting portion 340 comprises flip-flops 352 and 354 and an AND gate 356. The flip-flop 352 outputs the third counting signal (CNT3) which is input in response to the falling edge of the first signal (S1). The flip-flop 354 inverts the output signal of the flip-flop 352 (that is input in response to the system clock signal (CKB)) to output the result to a negative output terminal QN. The AND gate 356 performs an AND operation on the signals output from the flip-flops 352 and 354, and outputs the result as a second detection signal (S3). As shown in FIG. 9(i), the second detection signal (S3) is enabled when the zero crossing signal (Z_CRS) of the third interval (RGN3) subsequently to the zero crossing signal (Z_CRS) of the first interval (RGN1) is input.

A third detecting portion 360 of the first data detecting portion 300 receives the third counting signal (CNT3) in response to the second zero crossing signal (Z_CRS), and detects the zero crossing signal (Z_CRS) of the third interval (RGN3) subsequently to the zero crossing signal (Z_CRS) of the third interval (RGN3).

Preferably, the third detecting portion 360 comprises flip-flops 362 and 364 and an AND gate 366. The flip-flop 362 outputs the third counting signal (CNT3) which is input in response to the zero crossing signal (Z_CRS). The flip-flop 364 outputs the output signal of the flip-flop 362 in response to the zero crossing signal (Z_CRS). The AND gate 366 performs an AND operation on the output of the flip-flop 364 and the zero crossing signal (Z_CRS), and output the result as a third detection signal (S4). As shown in FIG. 9(j), the third detection signal (S4) is enabled when the zero crossing signal (Z_CRS) of the third interval (RGN3) is input subsequently to the zero crossing signal (Z_CRS) of the third interval (RGN3).

The OR gate 370 of the first detection portion 300 performs an OR operation on the first through third detection signals (S2–S4 as shown in FIGS. 9(h)–(j)), each being generated by the first through third detecting portions 310, 340, and 360, and outputs the result as a first data detection signal (DATA 1) as shown in FIG. 9(k).

The flip-flop 414 of a second data detecting portion 400 according to the present invention outputs the third counting signal (CNT3), which is input in response to the zero crossing signal (Z_CRS), as a second signal (S5), as shown in FIG. 10(e). A second reset signal generating portion 450 receives the second signal (S2) in response to the system clock signal (CKB) and generates a second reset signal (RS2) for resetting a fourth detecting portion 410.

Preferably, the second reset signal generating portion 450 comprises a flip-flop 452, a NAND gate 454, and an AND gate 456. The flip-flop 452 delays the second signal (S5) shown in FIG. 10(e) by one cycle of the system clock signal (CKB) in response to the system clock signal (CKB), inverts the delayed second signal, and outputs the signal via a negative output terminal QN. The NAND gate 454 performs a NAND operation on the second signal (S5) and the signal output from the negative output terminal QN of the flip-flop 452. The AND gate 456 performs an AND operation on the output signal of the NAND gate 454 and the system reset signal (RSTN) and outputs the result as the second reset signal (RS2). As shown in FIG. 10(f), the second reset signal (RS2) resets the fourth detecting portion 410 when the zero crossing signal (Z_CRS) of the third interval (RGN3) is input.

The fourth detecting portion 410 of the second data detecting portion 400 receives the first and second counting signals (CNT1 and CNT2) in response to the second signal (S5), and detects the zero crossing signal (Z_CRS) of the first or second interval (RGN1 or 2). When the zero crossing signal (Z_CRS) of the first or second interval (RGN1 or 2) is detected and the next zero crossing signal (Z_CRS) of the first interval (RGN1) is detected, the fourth detecting portion 410 generates the fourth detection signal (S6) indicating of the detection of data "0".

Preferably, the fourth detecting portion 410 comprises OR gates 412 and 424, AND gates 418 and 422, and flip-flops 416 and 420. The OR gate 412 performs an OR operation on the first and second counting signals (CNT1 and CNT2) and outputs the result to the flip-flop 416. The output of the OR gate 412 is shown in FIG. 10(g). The flip-flop 416 outputs the output signal of the OR gate 412 which is input in response to the falling edge of the second signal (S5), and is reset in response to the second reset signal (RS2). The output of the flip-flop 416 is shown in FIG. 10(h). The AND gate 418 performs an AND operation on the output of the flip-flop 416 and the first counting signal (CNT1) and outputs the result to the flip-flop 420. The flip-flop 420 receives the output signal of the AND gate 418, and outputs the signal that is received in response to the zero crossing signal (Z_CRS), as shown in FIG. 10(i).

The AND gate 422 performs an AND operation on the output signal of the flip-flop 420 shown in FIG. 10(i) and the zero crossing signal (Z_CRS), and outputs the result as the fourth detection signal (S6). That is, if the zero crossing signal (Z_CRS) of the second or first interval (RGN2 or 1) is detected after detection of the zero crossing signal (Z_CRS) of the third interval (RGN3), the AND gate 422 generates the fourth detection signal (S6). The forth detection signal (S6) indicates that data "0" is generated in a next zero crossing signal (Z_CRS). The OR gate 424 performs an OR operation on the fourth detection signal (S6) and the fourth counting signal (CNT4), and outputs the result as a second data detection signal (DATA2). That is, as described above, if the zero crossing signal (Z_CRS) of the zero crossing interval no less than 625.7 μs is input, it can be considered that undesired data is input and data "0" exists. Thus, the OR gate 424 outputs the second data detection signal (DATA2), which is enabled when the fourth counting signal (CNT4) (that is enabled in response to the zero crossing signal (Z_CRS) of the fourth interval) is input or enabled when the fourth detection signal (S6) is input.

A data output portion 500 according to the present invention outputs a logic value. For example, the data output portion 500 outputs a logic value "high" as detection data (DATA) when the enabled first data detection signal (DATA1) is input to an enable terminal CE in response to the system clock signal (CKB). The data output portion 500 outputs a logic level "low" as the detection data (DATA) when the enabled second data detection signal (DATA2) is input to a reset terminal R in response to the system clock signal (CKB).

Figure 11:
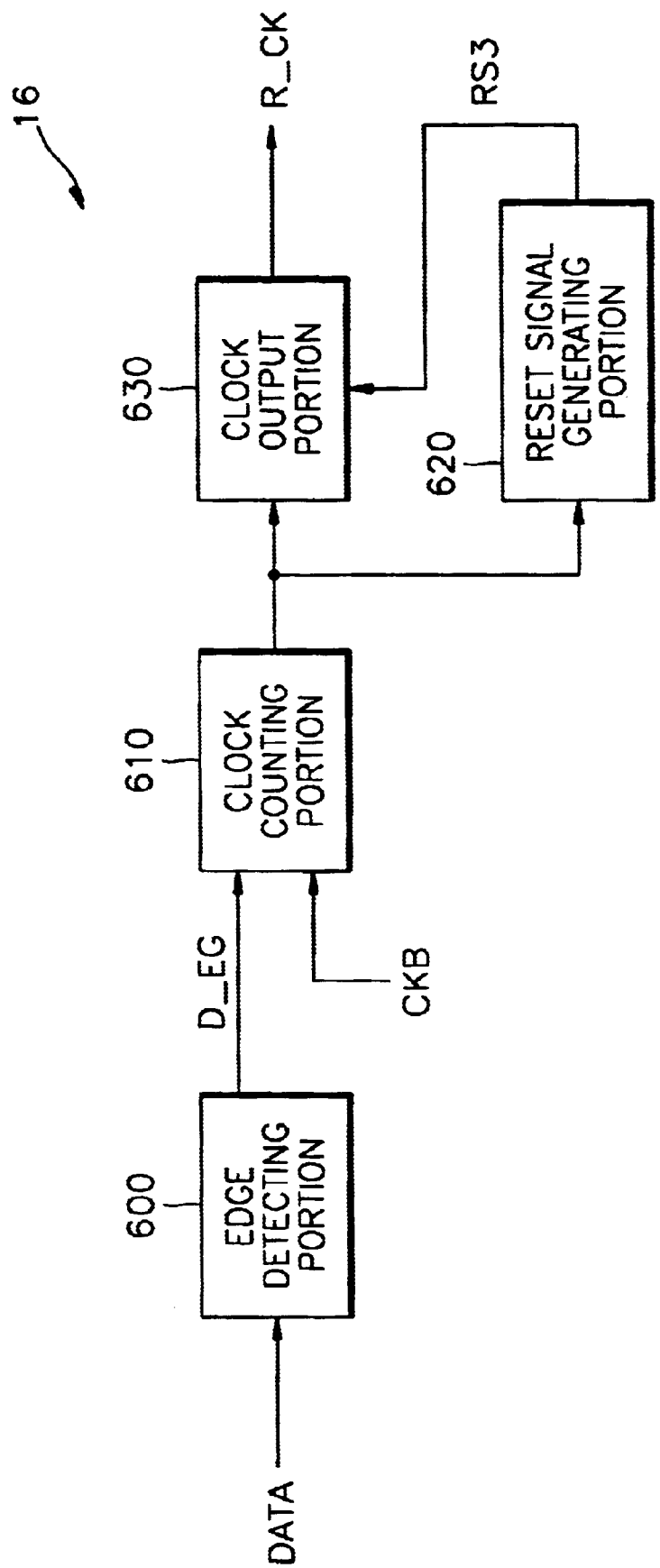
FIG. 11 is a block diagram of a clock generator of a caller ID demodulation according to the present invention.

FIG. 11 is a block diagram of a clock generator 16 according to the present invention. The clock generator 16 comprises an edge detecting portion 600, a clock counting portion 610, a clock output portion 630, and a reset signal generating portion 620. Referring to FIG. 11, the edge detecting portion 600 receives extracted data (DATA) from a data extractor 14, detects the rising or fall edge of the extracted data (DATA), and outputs the detected edge as an edge detection signal (D_EG). The clock counting portion 610 counts the number of cycles of a system clock signal (CKB), and is reset in response to the edge detection signal (D_EG) or is rest when the number of cycles reach n(>1)+1. Here, the time for counting the number of cycles of the system clock signal (CFK) to "n" corresponds to a unit data length. As described above, when data transmission speed is 1.2 Kbps, a unit data length is 1/1.2 Kbps (i.e., about 833 μs).

The reset signal generating portion 620 generates a reset signal (RS3) when the number of the cycles counted by the clock counting portion 610 is "n" or an edge is detected by the edge detecting portion 600. The clock output portion 630 outputs a data recovery clock signal (R_CK) that is enabled when the clock counting portion 600 counts the number of cycles to n/2 and disabled in response to the reset signal (RS3). Here, the n/2 indicates the middle point (i.e., about 416 μs) of the unit data length. In this way, the clock output portion 630 generates the data recovery clock signal (R_CK) that is enabled at the middle point of the unit data length, thereby recovering data accurately.

Figure 12:
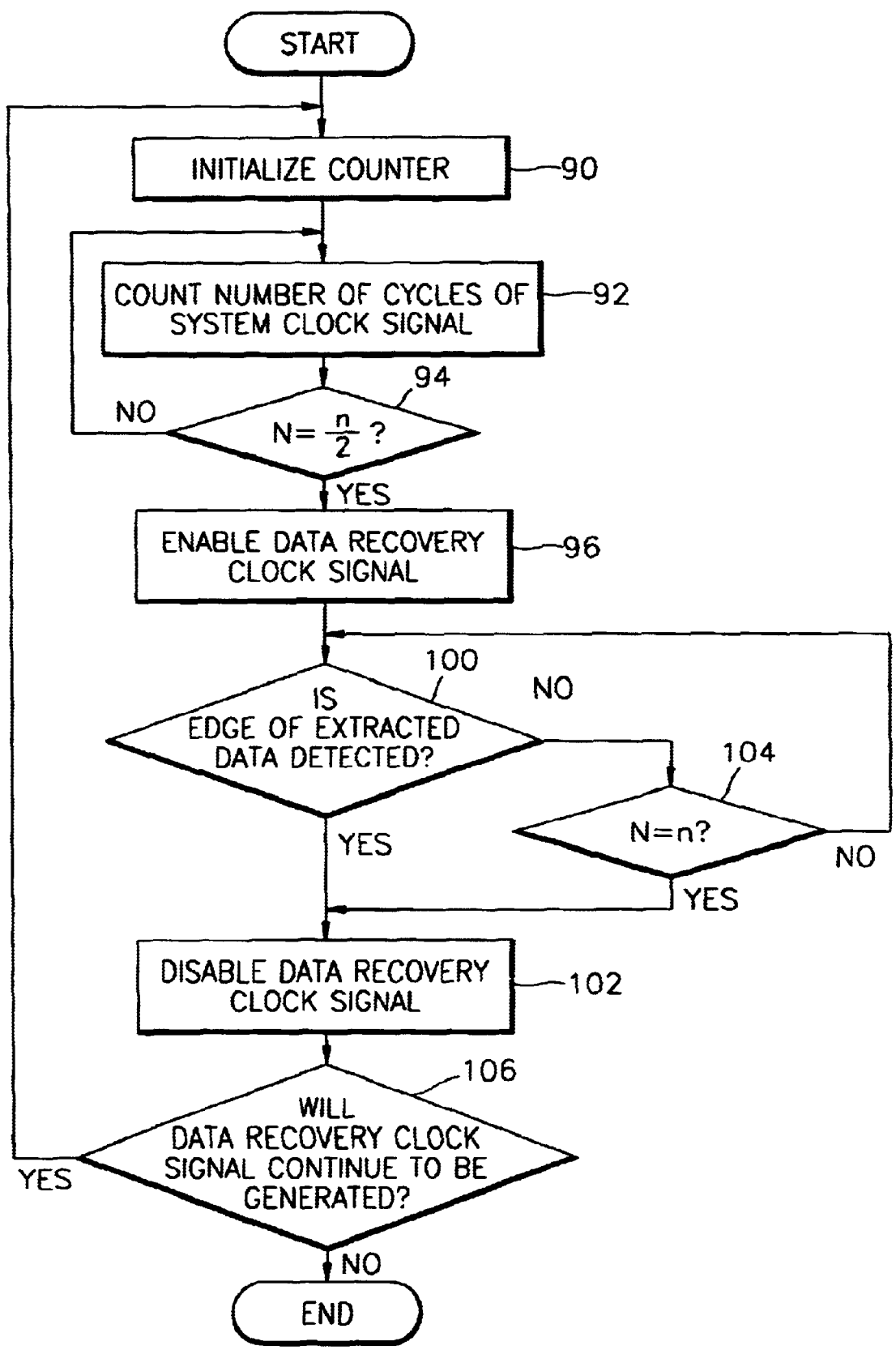
FIG. 12 is a flowchart showing a clock generation method according to an embodiment of the present invention.

FIG. 12 is a flowchart showing a clock generation method according to an embodiment of the present invention. Referring to FIGS. 11 and 12, a clock counting portion 610 is initialized (step 90) to count the number of cycles of a system clock signal (CKB) (step 92). The clock generator 16 determines whether a count value N output from the clock counting portion 610 is n/2 (step 94) and, if the value N is n/2, enables a data recovery clock signal (R_CK) (step 96). That is, the data recovery clock signal (R_CK) is enabled to extract data at the middle point of a unit data length.

At step 100, it is determined whether an edge detection signal (D_EG) is input, i.e., whether the rising or falling edge of an extracted data (DATA) is measured. If it is determined that the edge detection signal (D_EG) is input, the data recovery clock signal (R_CK) is disabled (step 102). However, if no edge detection signal (D_EG) is input, it is determined whether the count value N of the clock counting portion 610 corresponds to "n" (step 104). If the count value N does not reach the number of "n" at the step 104, the step 100 is repeated. If the count value N reach the number of "n" at the step 104, the step 102 is performed to disable the data recovery clock signal (R_CK). For example, if the edge of the extracted data (DATA) is not detected until the count value N reach "n", the successively generated data (DATA) is the same data. At step 106, it is determined whether the data recovery clock signal (R_CK) is continuously generated. If the data recovery clock signal is continuously generated, the previous steps (steps 90–102) are repeated, otherwise, the processing is end.

As described above, a clock generator 16 according to the present invention generates a clock signal which is enabled for extracting data at the middle point of an unit data length based on a data transfer rate, thereby recovering data accurately.

Figure 13:
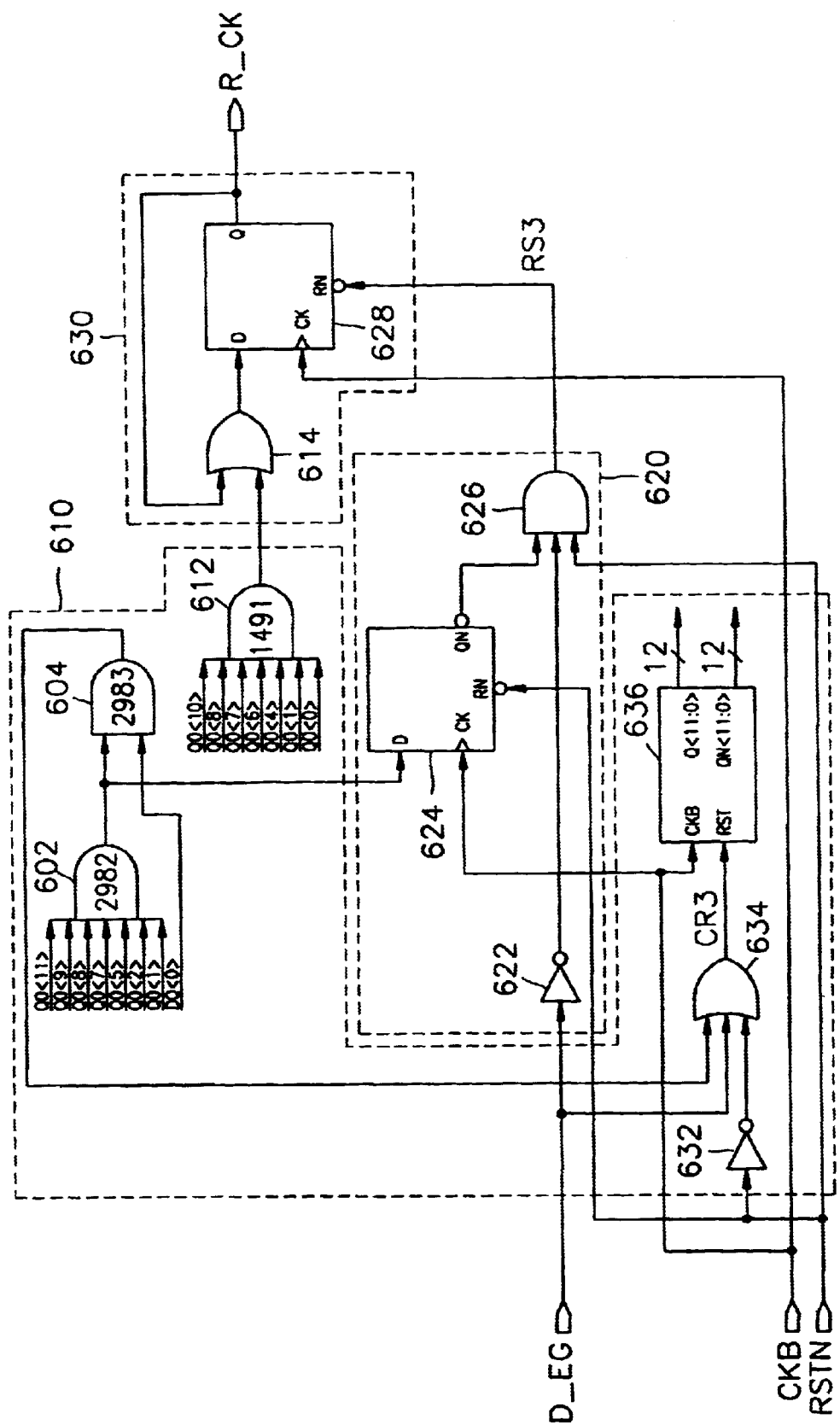
FIG. 13 is a detailed circuit diagram of the clock generator of FIG. 11.

FIG. 13 is a detailed circuit diagram of the clock generator of FIG. 11 which comprises a clock counting portion 610, a clock output portion 630, and a reset signal generating portion 620. Referring to FIG. 13, the clock counting portion 610 comprises an inverter 632, an OR gate 634, a counter 636, and AND gates 602, 604, and 612. The clock output portion 630 comprises an OR gate 614 and a flip-flop 628, and the reset signal generating portion 620 comprises an inverter 622, a flip-flop 624, and an AND gate 626.

Figure 14:
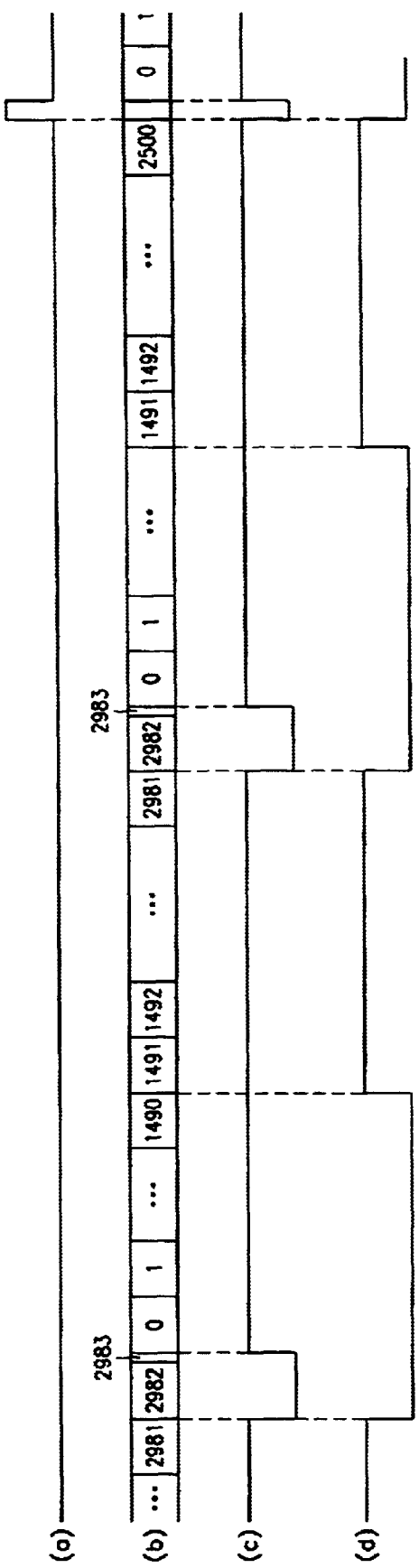
FIGS. 14(a)–14(d) are operational waveforms showing of the clock generator of FIG. 13.

FIGS. 14(a)–14(d) are operational waveforms of the circuit of FIG. 13. FIG. 14(a) shows the waveform of an edge detection signal (D_EG), FIG. 14(b) shows the waveform of the count result of the counter 636, FIG. 14(c) shows the waveform of the output signal of the flip-flop 624, and FIG. 14(d) shows the waveform of the data recovery clock signal (R_CK) output from the flip-flop 628.

The counter 636 of the clock counting portion 610 (for example, a 12-bit counter) counts the number of cycles of a system clock signal (CKB), and is reset in response to a counter reset signal (CR3). The inverter 632 inverts a system reset signal (RSTN), and the OR gate 634 performs an OR operation on the edge detection signal (D_EG) shown in FIG. 14(a) and the inverted system reset signal output from the inverter 632, and outputs the result as the counter reset signal (CR3). The AND gate 604 outputs a signal which is enabled while the counter 636 counts the number of cycles of the system clock signal (CKB) to "n+1" (e.g., 2983 in FIG. 14). The AND gate 602 outputs a signal which is enabled while the counter 636 counts the number of the cycles to "n" (e.g., 2982). Here, the time for counting from 0 to 2982 corresponds to a unit data length (i.e., 833 µs). The AND gate 612 outputs a signal which is enabled while the counter 636 counts the number of the cycles to n/2 (1491). Here, the time for counting from 0 to 1491 corresponds to half of the unit data length. As a result, if the counter 636 counts the number of the cycles from 0 to 2983 or the edge detection signal (D_EG) is input, the counter 636 is reset and recounts the number of cycles of the system clock signal (CKB) from zero.

The flip-flop 624 of the reset signal generating portion 620 inverts the output signal of the AND gate 602 which is input in response to the system clock signal (CKB), and outputs the result to a negative output terminal QN. The inverter 622 inverts the edge detection signal (D_EG), and the AND gate 626 performs an AND operation on the signal output from the negative output terminal QN of the flip-flop 624 and the inverted edge detection signal from the inverter 622, and outputs the result as the reset signal (RS3). The reset signal (RS3) is as shown in FIG. 14(c). That is, the reset signal (RS3) resets the counter 636 when the number of counting values reach 2982 (which corresponds to a unit data length), or the edge detection signal (D_EG) is input.

The OR gate 614 of the clock output portion 630 performs an OR operation on the signal output from a positive output terminal Q of the flip-flop 628 and the signal output from the AND gate 612 of the clock counting portion 610. The flip-flop 628 outputs the output signal of the OR gate 614 which is input in response to the system clock signal (CKB), and is reset in response to the reset signal (RS3). As a result, the flip-flop 628 generates the data recovery clock signal (R_CK) as shown in FIG. 14(d). The data recovery clock signal (R_CK) is enabled when the counter 636 counts the number of the cycles from 0 to 1491, and is reset when the counter 636 counts the number of the cycles from 0 to 2982 or the edge detection signal (D_EG) is input.

Advantageously, a caller ID demodulation apparatus and method thereof using multiple thresholds, according to the present invention, comprise two or more thresholds to extract data in demodulating a caller ID modulated in a CPFSK format, thereby extracting data accurately during an interval where data "0" and "1" coexist. Furthermore, a data recovery clock signal for demodulating extracted data is generated at about the middle point of the unit data length of the extracted data, thereby demodulating data accurately.

While this invention has been particularly shown and described with reference to a preferred embodiment thereof, it will be understood by those skilled in the art that various changes in form and details may be made therein without departing from the spirit and scope of the invention as defined by the appended claims.

What is claimed is:

1. A demodulator for demodulating caller identification (ID) information modulated in a continuous phase frequency shift keying (CPFSK) format, comprising:

a zero crossing detector for generating pulses at points where the modulated caller ID information crosses zero and outputs each pulse as a zero crossing signal;

a data extractor for computing a zero crossing interval between each output pulse of the zero crossing signal, and comparing the zero crossing interval with a plurality of thresholds to generate extracted data; and a clock generator for generating a data recovery clock signal for recovering the extracted data in response to the extracted data, wherein the data recovery clock signal is enabled at the middle point of the unit data length of the extracted data.

2. The demodulator of claim 1, wherein the extracted data comprises first extracted data having a logic value of high and second extracted data having a logic value of low.

3. The demodulator of claim 1, further comprising a noise filter for eliminating the zero crossing signal having the zero crossing interval less than a predetermined value, to thereby remove high frequency component noise.

4. The demodulator of claim 1, further comprising a data and clock reproducer for extracting caller ID information from the extracted data to output the caller ID information as reproduced data, and outputting the data recovery clock signal as a reproduced clock signal.

5. The demodulator of claim 1, wherein the data extractor comprises:

a counter, which is reset in response to the zero crossing signal, for counting the number of cycles of a system clock signal having a frequency divided at a predetermined frequency division rate, and generating a first, second and third counting signal, wherein the first counting signal is enabled when a count value is not greater than a first threshold, wherein the second counting signal is enabled when the count value is between the first threshold and a second threshold that is greater than the first threshold, and wherein the third counting signal is enabled when the count value is greater than the second threshold;

a first data detector for generating a first data detection signal indicating that the first extracted data is detected when the third counting signal is input in response to the zero crossing signal or when a predetermined period of time is lapsed after the second counting signal is input in response to the zero crossing signal subsequent to the input of the first counting signal in response to the zero crossing signal;

a second data detecting portion for generating a second data detection signal indicating that the second extracted data is detected when the first counting signal is input in response to the zero crossing signal after the first or second counting signal has been input in response to the zero crossing signal; and a data output portion for outputting the extracted data, wherein the extracted data is enabled when the first data detection signal is input in response to the system clock signal, and is disabled when the second data detection signal is input in response to the system clock signal.

6. The demodulator of claim 1, wherein the data extractor comprises:

a counter, which is reset in response to the zero crossing signal, for counting the number of cycles of a system clock signal having a frequency divided at a predetermined frequency division rate and generating a first, second, third and forth counting signal, wherein the first counting signal is enabled when a count value is less than a first threshold, wherein the second counting signal is enabled when the count value is between the first threshold and a second threshold that is greater than the first threshold, wherein the third counting signal is enabled when the count value is between the second threshold to a third threshold that is greater than the second threshold, and wherein the fourth counting signal is enabled when the count value is greater than the third threshold;

a first data detector for generating a first data detection signal indicating that the first extracted data is detected when the third counting signal is input in response to the zero crossing signal or when a predetermined period of time is lapsed after the second counting signal is input in response to the zero crossing signal subsequent to the input of the first counting signal in response to the zero crossing signal;

a second data detecting portion for generating a second data detection signal indicating that the second extracted data is detected when the first counting signal is input in response to the zero crossing signal after the first or second counting signal has been input in response to the zero crossing signal or when the fourth counting signal is input in response to the zero crossing signal; and a data output portion for outputting the extracted data, wherein the extracted data is enabled when the first data detection signal is input in response to the system clock signal and is disabled when the second data detection signal is input in response to the system clock signal.

7. The demodulator of claim 1, wherein the clock generator comprises:

an edge detector for detecting a rising or falling edge of the extracted data and outputting the detected edge as an edge detection signal;

a clock counter for counting the number of cycles of a system clock signal, wherein the clock count is reset in response to the edge detection signal or when the number of the cycles is n+1 (n>1);

a clock output portion for outputting the data recovery clock signal, wherein the data recovery clock signal is enabled when the number of the cycles is n/2 and is disabled in response to a reset signal; and a reset signal generator for generating the reset signal.

8. The demodulator of claim 7, wherein the time for counting the number of cycles of the system clock signal up to n corresponds to the time corresponding to a unit data length.

9. A method for demodulating caller identification (ID) information modulated in a continuous phase frequency shift keying (CPFSK) format, the method comprising the steps of:

receiving the CPFSK-modulated caller ID information and generating a zero crossing signal, wherein the zero crossing signal comprises pulses produced at points where the modulated caller ID information crosses zero;

calculating a zero crossing interval between pulses of the zero crossing signal;

comparing the zero crossing interval with a plurality of thresholds to generate extract data; and generating a data recovery clock signal for recovering the extracted data, wherein the data recovery clock signal is enabled at the middle point of the unit data length of the extracted data.

10. The method of claim 9, wherein the step of comparing the zero crossing interval with the plurality of thresholds to generate the extracted data comprises the step of generating first extracted data having a logic value of high and second extracted data having a logic value of low based on the comparison result.

11. The method of claim 9, further comprising the step of eliminating the zero crossing signal having the zero crossing interval that is less than a predetermined value, to thereby remove high frequency component noise.

12. The method of claim 9, further comprising the steps of generating reproduced data by extracting caller ID information from the extracted data; and outputting the data recovery clock signal as a reproduced clock signal.

13. The method of claim 10, wherein the step of generating the first and second extract data based on the comparison result comprises the steps of:

(a) calculating a next zero crossing interval when the zero crossing interval is less than a first threshold;

(b) generating the second extracted data when the next zero crossing interval of the step of (a) is less than the first threshold;

(c) generating the first extracted data when the zero crossing interval is greater than a second threshold which is greater than the first threshold;

(d) determining whether a previously extracted data is the first or second extracted data when the zero crossing interval is between the first threshold and the second threshold;

(e) calculating the next zero crossing interval when the previously extracted data of the step of (d) is the first extracted data and generating the second extracted data when the next zero crossing interval is less than the first threshold; and (f) generating the first extracted data after a predetermined period of time has lapsed when the previously extracted data of the step of (d) is the second extracted data.

14. The method of claim 10, wherein the step of generating the first and second extract data based on the comparison result comprises the steps of:

(a) calculating a next zero crossing interval when the zero crossing interval is less than a first threshold;

(b) generating the second extracted data when the next zero crossing interval of the step of (a) is less than the first threshold;

(c) generating the first extracted data when the zero crossing interval is greater than a second threshold that is greater than the first threshold;

(d) determining whether a previously extracted data is the first or second extracted data when the zero crossing interval is between the first threshold and the second threshold;

(e) calculating the next zero crossing interval when the previously extracted data of the step of (d) is the first extracted data and generating the second extracted data when the next zero crossing interval is less than the first threshold; and (f) generating the first extracted data after a predetermined period of time has lapsed when the previously extracted data of the step of (d) is the second extracted data; and (g) generating the second extracted data when the zero crossing interval is greater than a third threshold greater than the second threshold.

15. The method of claim 9, wherein the step of generating the data recovery clock signal for recovering the extracted data comprises the steps of:

initializing the number of cycles of a system clock signal;

counting the number of the cycles until n/2 (n>1) and enabling the data recovery clock signal when the number of the cycles is n/2;

determining whether a rising or falling edge of the extracted data is detected while the number of the cycles is greater than n/2 and less than n; and disabling the data recovery clock signal when the rising or falling edge of the extracted data is detected or the number of the cycles is n.

16. The method of claim 15, wherein the time for counting the number of the cycles of the system clock signal up to n corresponds to the unit data length.

17. An apparatus for generating a data recovery clock signal that is used for recovering data extracted from a demodulator, the apparatus comprising:

an edge detector for detecting a rising or falling edge of the extracted data and outputting the detected edge as an edge detection signal;

a clock counter for counting the number of cycles of a system clock signal, wherein the clock counter is reset in response to the edge detection signal or when the number of the cycles is n+1 (where n>1);

a clock generator for generating a data recovery clock signal for recovering the extracted data, wherein the data recovery clock signal is enabled when the number of the cycles is n/2 and is disabled in response to a reset signal; and a reset signal generator for generating the reset signal.

18. The apparatus of claim 17, wherein the time for counting the number of cycles of the system clock signal up to n corresponds to the time corresponding to a unit data length of the extracted data.

19. A method for generating a data recovery clock signal that is used for recovering data extracted from a demodulator, the method comprising the steps of:

initializing the number of cycles of a system clock signal;

counting the number of cycles of the system clock signal until n/2 (where n>1) and generating a data recovery clock signal when the number of the cycles is n/2;

determining whether a rising or falling edge of the extracted data is detected while the number of the cycles is greater than n/2 and less than n; and disabling the data recovery clock signal when the edge of the extracted data is detected or the number of the cycles is n.

20. The method of claim 19, wherein the time for counting the number of the cycles of the system clock signal up to n is a unit data length of the extracted data.

* * * * *